United States Patent [19]

Drews et al.

[11] Patent Number: 5,467,081
[45] Date of Patent: Nov. 14, 1995

[54] DATACARRIERS WITH SEPARATE STORAGE OF READ AND WRITE-INHIBITED MEMORY LOCATIONS

[75] Inventors: Steffen Drews, Hamburg; Wolfgang Tobergte, Halstenbek; Volker Timm, Pinneberg; Klaus Axer, Lübeck, all of Germany

[73] Assignee: U.S. Philips Corporation, New York, N.Y.

[21] Appl. No.: 20,497

[22] Filed: Feb. 22, 1993

[30] Foreign Application Priority Data

Feb. 22, 1992 [DE] Germany .................. 42 05 567.9

[51] Int. Cl.⁶ .................. G07C 1/00; G11C 15/00
[52] U.S. Cl. .................. 340/825.34; 340/825.54; 365/195; 365/228
[58] Field of Search .................. 235/487, 488, 235/380; 902/26; 380/23, 25; 340/825.54, 825.34; 365/203.3, 195, 228

[56] References Cited

U.S. PATENT DOCUMENTS

| | | | |
|---|---|---|---|
| 3,971,916 | 7/1976 | Moreno | 395/425 |
| 4,211,919 | 7/1980 | Ugon | 235/487 |
| 4,734,568 | 3/1988 | Watanabe | 235/487 |
| 5,014,312 | 5/1991 | Lisimaque et al. | 380/25 |
| 5,111,433 | 5/1992 | Miyamoto | 365/195 |
| 5,119,336 | 6/1992 | Itoh | 365/195 |
| 5,206,938 | 4/1993 | Fujioka | 235/380 |
| 5,285,055 | 2/1994 | Oonakahara et al. | 235/487 |
| 5,293,424 | 3/1994 | Holtey et al. | 380/23 |

*Primary Examiner*—Thomas G. Black
*Assistant Examiner*—David Yiuk Jung
*Attorney, Agent, or Firm*—Michael J. Balconi-Lamica; Anne E. Barschall

[57] ABSTRACT

Portable data carriers are known for different applications, for example as so-called smart cards for bank transactions or for access control or for combined applications. For the various applications different subdivisions of the write/read memory in the data carrier are required so that given zones cannot be read and other zones can only be read and not be written. This subdivision is customarily implemented during the manufacture of the card or the chip. In order to obtain a chip which can be flexibly adapted to various applications, in accordance with the invention the memory in the data carrier is subdivided into a number of blocks which are inhibited from reading or writing by read inhibit and write inhibit information stored in different locations in one or two blocks of the memory. The writing in non-inhibited blocks can additionally be made dependent on a previous transmission of a correct password, the password also being stored in one of the blocks in the memory of the data carrier. As a result, the password as well as the inhibit information can be treated as normal information and, if necessary, they can also be repeatedly overwritten. When the block storing the write inhibit information, and preferably also the password, is inhibited from overwriting, part of the memory of the data carrier becomes a read-only memory.

13 Claims, 3 Drawing Sheets

DATACARRIERS WITH SEPARATE STORAGE OF READ AND WRITE-INHIBITED MEMORY LOCATIONS

BACKGROUND OF THE INVENTION

The invention relates to a datacarrier for detachable coupling to a terminal for data exchange between the terminal and the datacarrier, the datacarrier comprising a read/write memory and inhibiting means, arranged for inhibiting or enabling reading and/or writing in the memory by the terminal. The invention also relates to a method for writing into such a data carrier and to an integrated circuit for use in such a datacarrier.

A datacarrier of this kind is known from U.S. Pat. No. 3,971,916. The cited Patent describes several possibilities for storing inhibit information. One possibility consists in that for each use the memory is continuously addressed from the beginning, the complete addresses being compared with fixed addresses in two comparators, said fixed addresses denoting, for example the beginning and the end of an inhibited zone. These addresses are fixed in advance during the manufacture of the data carrier. Instead of a comparator, use can also be made of a counter which counts down a number of inhibited addresses. The number and the starting point, for example the address zero, are again fixed during manufacture of the card. Another possibility of inhibiting given memory locations from overwriting consists in that an additional bit is stored in each memory location during the write operation, said bit inhibiting the relevant memory location against overwriting. However, in that case it is also impossible to overwrite these memory locations if it were desirable to do so. Thus, this known data carriers is intended specifically intended for a very specific application. Therefore, different data carriers must be designed for each specific application.

U.S. Pat. No. 4,211,919 describes a data carrier in which the memory section is subdivided into three zones. The first zone contains data which is secret, can be used only within the data carrier, and cannot be overwritten. The second zone is freely available for writing and reading from or to the environment, it being necessary to transmit correct passwords in advance in order to write and read in this zone, depending on given protective information. This password information is stored in the third zone of the data carrier in which no writing but exclusively reading is possible. The limit addresses for the individual zones are also contained in the third zone and cannot be modified any longer after initialization of the data carrier.

SUMMARY OF THE INVENTION

Amongst others, it is an object of the invention to propose a datacarrier of the kind set forth in which the zones of the memory which are inhibited from reading or writing can be flexibly adapted to different applications by the user and, if desired, modified at a later stage, a high degree of protection against illicit reading or writing still being ensured.

This object is achieved in accordance with the invention in that the memory is organized in blocks, each comprising a plurality of memory locations, the memory comprising first locations for write inhibiting information, identifying blocks which are inhibited for writing, second locations for read inhibiting information, identifying blocks which are inhibited for reading, third memory locations for a password, a fourth memory location for a mode bit, the inhibiting means being arranged for inhibiting writing in blocks identified by said write inhibiting information, and for inhibiting reading in blocks identified by said read inhibiting information, and for performing a comparison of password information transmitted from the terminal to the datacarrier with the password in the third memory locations and for enabling or disabling writing in those blocks which are not inhibited for writing by the write inhibiting information under combined control of the mode bit and a result of the comparison.

The memory zones which are inhibited from reading and writing are thus also determined by information which is stored in the memory itself. As a result of the subdivision of the memory into individual blocks and the fact that the inhibit information for reading and for writing is always coherent but stored separately in the memory, very flexible use of the data carrier in conjunction with the password is possible. The inhibit information for writing and reading can consist in the simplest case of a bit separately present in a predetermined location for each block. Alternatively one may for example use the number of a first block in a series of blocks which is not inhibited from writing or reading and the number of a last block in the series to identify the blocks which are not inhibited. The mode bit serves for example to adjust whether writing is allowed with or without password.

An embodiment of the data carrier according to the invention is characterized, in that the inhibiting means are arranged for enabling writing conditional upon whether the password information matches the password when the mode bit has a first value enabling writing unconditionally when the mode bit has a second value. In this way the mode bit is used to indicate whether or not a password is required to write in the uninhibited blocks. In the extreme case where the password information is not necessary for writing because of the second value of the mode bit, and where the first locations are not write protected, the data carrier can be written and read at random, because a possibly present write inhibit information can then be overwritten. However, this is not possible in the event of the first value of the mode bit, only reading then being possible, that is to say from non-inhibited blocks. However, if the password is known, writing and reading can take place at random also because any inhibit information present is overwritten in advance. A modification of the indication of the blocks which can be read without knowledge of the password is also possible with knowledge of the password.

However, it is also possible to inhibit the block containing the write inhibit information itself from overwriting. In that case the subdivision into blocks which can be overwritten and blocks representing quasi-read-only memories, can no longer be modified, even when the password is known. The writing in non-inhibited blocks, however, is possible only if the password is known, blocks which are not inhibited from reading still being readable in any case.

Even more flexible use is offered in an embodiment of the datacarrier in accordance with the invention in which the first and second locations are in mutually distinct blocks. The first and second locations may be provided in a first and second block respectively. Reading without knowledge of the password is then restricted to the blocks which are determined by the read inhibit information in the second memory locations in the second block, whereas, when the password is known, complete reading of the memory is possible in that the read inhibit information in the second block is overwritten accordingly. Notably when the first block is inhibited from overwriting, the reading without password can be restricted, for example to individual blocks which are inhibited from overwriting, whereas when the password is known, writing can take place in blocks which are not inhibited from writing and reading can take place in all blocks. This subdivision, or another subdivision, can be chosen by the user in dependence on the relevant application and can be adjusted by normal write operations, without special steps being required.

The fourth storage locations for the password can be provided in an arbitrary block. This is because in principle a password present can also be overwritten by a new password when the present password is known. The possibility of leaving the password overwritable can be inhibited by inhibiting the block containing the password from overwriting. However, this makes sense only if at the same time the block containing the write inhibit information is also inhibited from overwriting. Therefore, in a further version of the method in accordance with the invention the first, third and fourth locations are in the same block. Thus the fourth memory locations for the password and the third memory location for the mode bit are provided in the first block. This enables more liberal use of the other blocks.

An embodiment of the datacarrier according to the invention is characterized, in that the data carrier comprises addressing means, for supplying a block address and an intrablock address to the memory, and in that the inhibiting means comprise a first register, for loading the write inhibiting information from the memory, a first comparator, having inputs coupled to the addressing means and the first register, for receiving the block address and contents of the first register and comparing the same with the block address, and for thereupon forming a first output signal for inhibiting or enabling writing, a second comparator, arranged for comparing the transmitted password information with the password, and for thereupon forming a second output signal, a second register, for loading the mode bit from the memory, and for forming a third output signal therefrom, control means, arranged for receiving the first, second and third output signals and for inhibiting and enabling writing in the memory in response thereto. This embodiment requires only limited means and results in a data carrier which can be used in a variety of ways. Also, in the case of a write request on the data carrier, it can be very quickly signalled to the terminal whether such a request can be granted or whether an inhibited block is concerned, because the inhibit information is directly available without a read operation.

The value of the mode bit determines whether or not the complete password information must be transferred prior to the write operation. Initially, this is not simply known at the terminal when this information has not been read in advance from the data carrier. In a method for writing into the data carrier in accordance with the invention a write operation comprises the following steps:

establishing contact between the terminal and the datacarrier, transmitting mode information from the terminal to the datacarrier, and after that, transmitting the password information, wherein in the data carrier said mode information is compared with the mode bit, and in case of mismatch, when the mode bit has the first value, and the mode information has the second value, the write operation is immediately terminated, when the mode bit has the second value and the mode information has another value, the comparison between the transmitted password and the password information is ignored. As a precaution the terminal can thus transfer the password information assumed to be correct, regardless of the knowledge of the mode bit. However, when the coupled data carrier actually does not require complete password information for writing in accordance with the binary value of the mode bit read, in the case of the second value of the mode bit read writing preferably takes place in non-inhibited blocks, irrespective of the transferred password information. The password information transferred by the terminal, therefore, is not considered by the data carrier and the further operations are executed as if no password information had been transferred. This operation can be controlled directly in that the mode information transferred with the password information is compared with the mode bit.

Four different combinations may occur during this comparison. In as far as the mode information corresponds to the mode bit stored, no problems are encountered. However, if this is not the case, the comparison should still initiate an unambiguously defined process. At the beginning of a write operation in the memory of the data carrier, preferably first a mode information is transferred to the data carrier where it is compared with the mode bit, non-correspondence in the case where the mode bit has one binary value and the mode information has the other binary value, ensuring that a subsequently transferred password information in the data carrier is not evaluated and in the case where the mode bit has the other binary value and the mode information has the one binary value, the write operation is directly interrupted. In the latter case, first appearing as an insolvable conflict, an unambiguous reaction takes place, it being possible to interrupt the write operation, for example in that, like upon the first coupling, the blocks which are not inhibited from reading in the data carrier are read in a cyclically repetitive manner so as to be transferred to the terminal.

A similar conflict arises when an incorrect password is transferred. Therefore, a further embodiment of the method in accordance with the invention is characterized in that when the mode bit has the first value and the mode information has the first value, in case of mismatch of the password and the password information, the write operation is immediately terminated. The data carrier can again enter the read state when the write operation is interrupted, and dispatch information to the terminal.

When the datacarrier is used, after the coupling of the data carrier to the terminal, the exchange of data therebetween can commence in different ways. An attractive embodiment of the method of reading the datacarrier according to the invention comprises establishing contact between the terminal and the datacarrier, and thereupon letting the datacarrier read contents of blocks for which reading is not inhibited, transmitting these blocks to the terminal in cyclic repetition, and inserting a pause after transmission of each block, the terminal transmitting a write request signal to the datacarrier in the pause when the terminal has write data for writing into the memory, the data carrier terminating transmission of the blocks upon reception of the write request signal. During the pause, the terminal, in the presence of data to be written into the data carrier, transfers a predetermined write request signal to the data carrier which terminates the read and transfer operation from the data carrier to the terminal and which prepares the data carrier for the reception of data to be written. In this manner an activity is started directly without requiring a preceding exchange of instructions between the data carrier and the terminal, the reading of the data carrier and the transfer to the terminal initially being the most important process since the terminal can then first, for example check the data carrier and a given, subsequent write operation can be chosen in dependence on the test result and the further contents of the data carrier. This write operation can be started after the reading of an arbitrary block, because an interval is inserted after each block read, so that substantially no waiting periods occur during writing.

Because reading generally takes place sequentially, in a further version of the method in accordance with the invention in the second memory locations there are stored the number of a first block which is not inhibited from reading and the number of a last block which is not inhibited for reading, said blocks and the intermediate blocks being read during a read operation. This requires only limited control means for checking whether a block is inhibited from reading, because in this manner a coherent section of generally a plurality of blocks is obtained which can be readily read.

In order to determine, already during reading, which blocks may be read but even which blocks may be overwritten and whether the complete password information is required for doing so, in a further version of the method in accordance with the invention first the complete write inhibit information or the complete read inhibit information as well as the mode bit is read from the memory prior to a write operation and prior to a read operation. As a result, notably in the case of a write request on the data carrier, it can be very quickly signalled to the terminal whether such a request can be granted or whether an inhibited block is concerned, because the inhibit information is directly available without a read operation.

BRIEF DESCRIPTION OF THE DRAWINGS

Embodiments of the invention will be described in detail hereinafter with reference to the drawings. Therein.

DETAILED DESCRIPTION OF THE PREFERRED EMBODIMENTS

Figure 1:
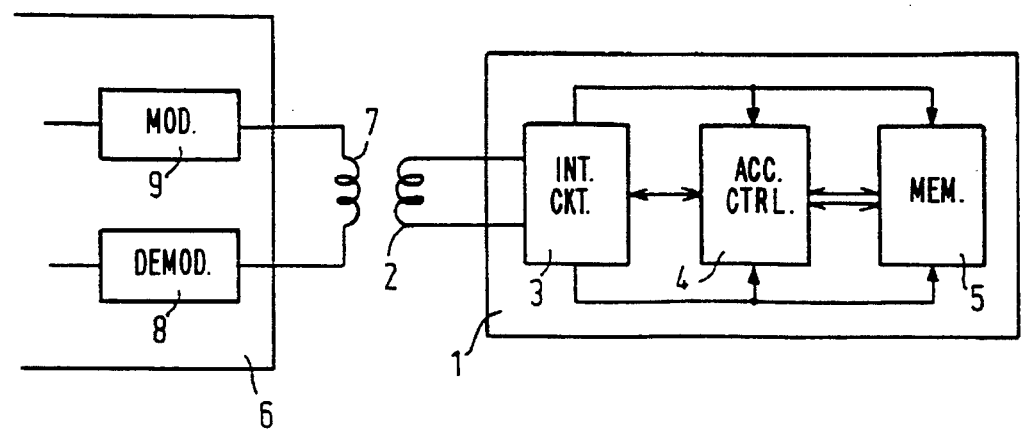
FIG. 1 shows diagrammatically a wireless coupling between data carrier and terminal, together with the most important elements.

Referring to FIG. 1, a data carrier 1 for wireless data transmission comprises a coil 2 via which not only data but also energy is transmitted to the data carrier 1. The coil 2 is connected to an interface circuit 3 which extracts supply voltages for the elements 4 and 5 from the energy received, reconstructs the data received for supply to the access control system 4, and also receives data read thereby for supply to the coil 2. The method of modulation of the data on a carrier and transmission of data between the coil 2 and the coil 7 of a terminal 6 are known per se and will not be elaborated herein because they are not important for a proper understanding of the present invention. The coil 7 is driven by a modulator 9 in the terminal 6 and transmits any data received to a demodulator 8. The further elements of the terminal 6 for processing the data received and for generating the data to be transmitted are not shown either.

Figure 2:
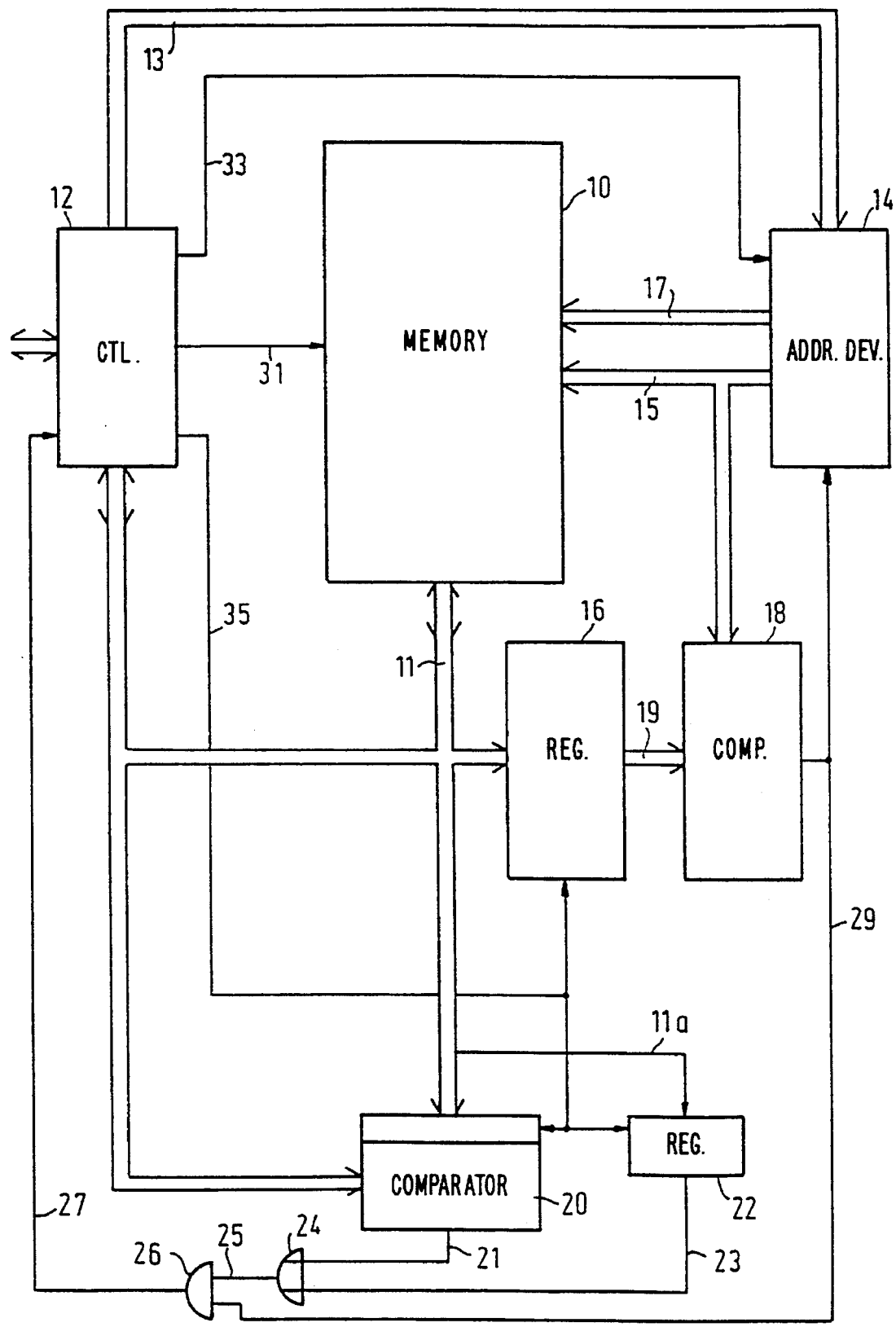
FIG. 2 shows the construction of the access control system in the data carrier in the form of a block diagram.

The access control system 4 in the data carrier 1 controls the reading of data from the memory 5 as well as the writing of data therein. Some essential elements of the access control system 4 and their interconnections are shown in FIG. 2 and will be described in detail hereinafter. Double lines indicate connections via which notably data and addresses are transmitted in a bit-parallel manner.

A memory 10, also shown in FIG. 2 and corresponding essentially to the memory 5 shown in FIG. 1, is controlled by an addressing device 14. Control takes place via a multi-bit connection 15 via which a block of memory locations in the memory 10 is selected, as well as via the multi-bit connection 17 which selects, within the selected block, a memory location for a multi-bit data word. The data words read or to be written are exchanged, via the connection 11, essentially by means of a control device 12.

The control device 12 communicates with the interface circuit 3 of FIG. 1 for the exchange of data. When the data received by the control device 12 represents, for example addresses for data to be subsequently written, this data is applied to the addressing device 14 via the connection 13, appropriate control signals being transmitted via the lead 33. When subsequently data to be written arrives, the control device 12 applies the data to be written to the data input of the memory 10, via the connection 11, and also applies, via the lead 31, a write signal to the memory 10, be it only if a write enable signal arrives via the lead 27.

In order to generate this enable signal on the lead 27, it is first necessary to read at least given blocks from the memory 10. The arrangement of the information in these blocks will be described in detail hereinafter. At this point it is merely to be noted that these blocks contain the password, the mode bit as well as the inhibit information for writing and reading.

This information successively appears on the connection 11. The password is written into a register of a comparator 20 under the control of the control device 12, via the lead 35, the mode bit is branched from the connection 11 from the corresponding bit lead, via the lead 11a, to a register 22, and the inhibit information for writing and reading is applied to a register 16 in which it is stored.

The stored inhibit information is applied, via the connection 19, to a comparator 18 which compares this inhibit information with the block address on the connection 15 which is supplied by the addressing device 14. When the relevant block is not inhibited from writing, the comparator 18 generates a signal on the lead 29 which is applied to one input of the AND-element 26. When the value of the mode bit stored in the register 22 indicates that no complete password need be supplied to enable writing in the memory, the register 22 outputs a signal on the lead 23 which reaches, via the OR-element 24 and the lead 25, the other input of the AND-element 26, so that an enable signal appears on the lead 27. However, when the mode bit has the other binary value, the correct password information must be applied to the data carrier, and hence to the control device 12, prior to writing; the control device 12 then applies the password information, via the connection 11, to the comparator 20 in which it is compared with the password stored in the register. In the case of correspondence, the output 21 outputs a signal which is applied, via the OR-element 24 and the lead 25, to the other input of the AND-element 26, thus generating an enable signal on the lead 27. Preferably, the password information is applied only once after the coupling of the data carrier to the terminal, the comparison result produced by the comparator being stored until the write operation, for example for a plurality of blocks, has been completed or until the data carrier is removed from the terminal again, so that a continuous signal is present on the lead 21.

In the present example the read inhibit information consists of the indication of the first and the last block enabled for reading. Via the connection 19, this information is applied to the comparator 18 and, when the block address generated by the addressing device 14 is situated outside this zone enabled for reading, the addressing device is advanced until the first block enabled for reading is reached. This block and the subsequent blocks are then successively read and output via the connection 11 and the control device, until the last block enabled for reading is reached.

The control device may also consist of a microprocessor. In that case the other elements shown in FIG. 2 are preferably included in the microprocessor, resulting in a simple construction. Some elements, for example the comparators, can then be present only once, their multiple use for different functions then being enabled by a program.

Figure 3:
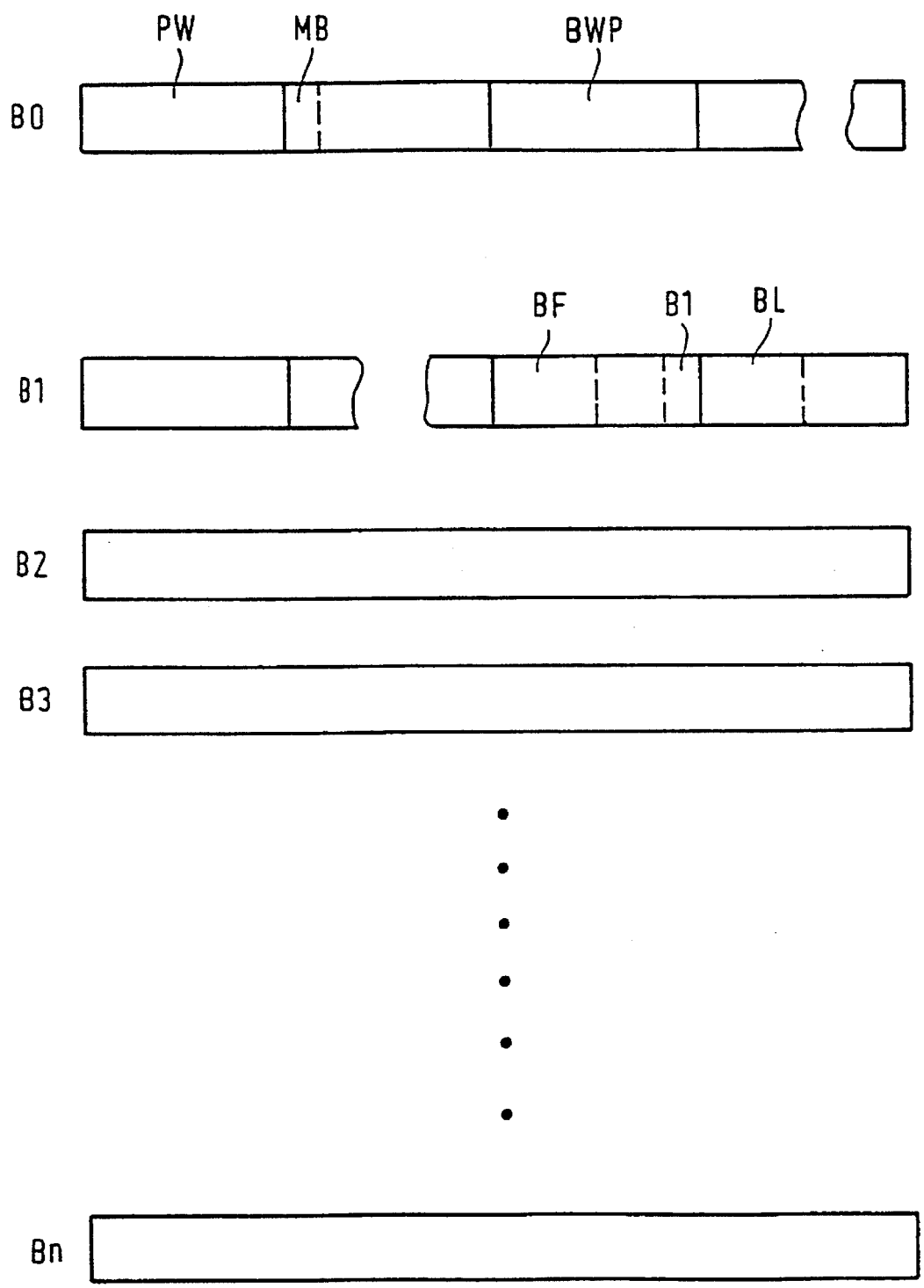
FIG. 3 shows the composition of the memory contents in the form of blocks and the assignment of given memory locations of the first two blocks.

FIG. 3 shows the logic construction of the memory 10 of FIG. 2. The entire address space of the memory is subdivided into a number of blocks B0 to Bn, a number of eight blocks being assumed hereinafter for the sake of simplicity. These blocks are addressed via the connection 15 of FIG. 2.

Each block contains a number of memory locations for respective data words comprising, for example eight bits. In the present example, 15 memory locations are provided per block, said locations being addressed via the connection 17 of FIG. 2.

At the beginning, the block B0 contains the password PW which occupies several memory locations, the mode bit MB in the next memory location, and the write inhibit information BWP in the subsequent memory location. For each block this inhibit information claims a given bit, because the eight bits of the memory word BWP can be unambiguously assigned to each time one of the eight blocks. When a bit has, for example the binary value "1", the associated block is inhibited from writing. Because a bit is also assigned to the block B0, this block can also be inhibited, so that not only the password and the mode bit can no longer be modified, but the subdivision of the entire memory into writable and write-protected blocks cannot be modified either. The write-protected blocks have thus become substantially read-only memories and their instantaneous contents are quasi-frozen. The further memory locations of the block B0 can be used for arbitrary purposes, depending on the relevant application.

The last two memory locations of the block B1 store information indicating which blocks are inhibited from reading to the environment of the data carrier. This is realised in that in a part BF of the last memory location but one there is stated a block number which indicates the first readable block and in that in a part BL of the last memory location there is stated the number of the last readable block. Furthermore, in the last memory location but one a bit B1 indicates whether the block B1 is to be additionally read or not.

The fact that the readable blocks are coherent or successive actually does not represent a restriction, because the assignment of the information to be written to the individual blocks can initially be chosen at random during writing, before individual blocks are inhibited from overwriting. Thus, the readable zone of blocks may comprise an arbitrary combination of write-inhibited blocks or blocks which are not write inhibited.

In most cases the block B1 is preferably not inhibited from overwriting, in that the associated bit in the memory word BWP in the block B0 is not evaluated, regardless of the contents. When the block B1 is not write protected, without knowledge of the password PW it is only possible to read blocks indicated by the contents of the last two memory locations of the block B1; however, when the password PW is known, these contents can be overwritten so that all blocks can then be read. However, if the blocks B0 and B1 were both protected against overwriting, the contents of the blocks situated outside the zone between the blocks BF and BL or B1 could never again be read from outside the data carrier.

The position of the memory locations for the password PW, the mode bit MB as well as the inhibit information BWP as well as BF and BL and B1, evidently, must be stored in the control device 12 in FIG. 2. The other memory locations and the other blocks can be used at random by the user.

Figure 4:
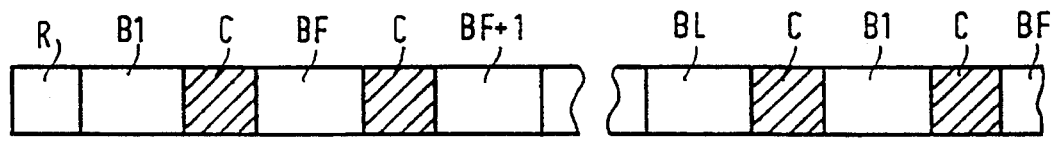
FIG. 4 shows diagrammatically the information sequence during reading from the data carrier.

When the data carrier 1 of FIG. 1 is coupled to the terminal 6, the access control system 4, or the control device 12 of FIG. 2, sets the data carrier initially to a read state. The time sequence of the information transmitted from the data carrier 1 to the terminal 6 is then as shown in FIG. 4.

After the coupling of the data carrier to the terminal, first the supply voltage is built tip in the data carrier and during the first time interval R all circuits are reset to an initial state. Moreover, the inhibit information of the blocks B0 and B1 is read internally. Subsequently, the contents of the block B1 are read, it being assumed that the bit B1 in this block has an appropriate value. Subsequently, the contents of the blocks BF, BF+1 indicated in block B1 are read, and so on until the last block BL. After that, the read operation cyclically commences again with the block B1 etc. If not read-protected, the block B1 is always transmitted first, so that in the terminal it is directly known, on the basis of the information of the last two memory locations, which blocks are to be subsequently transmitted.

Between the transmission of the contents of each time one block there is inserted, a period C during which the terminal can inform the data carrier whether data is to be written therein. This is realised, for example by the transmission of a given number of pulses at a given position in time after the end of the transmission of each time one block. When no pulses are transmitted, the cyclical read operation is continued. However, when the prescribed pulses arrive during the interval C, the data carrier terminates the read operation and subsequently awaits information from the terminal.

Figure 5A:
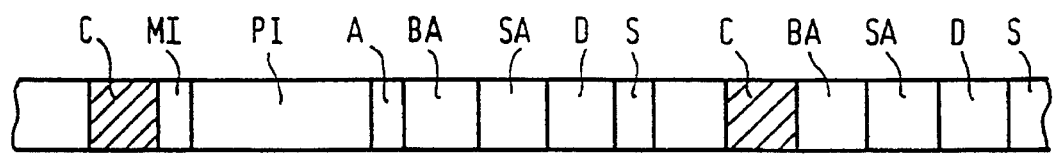
FIG. 5 shows the information sequence during writing in the data carrier.
Figure 5B:
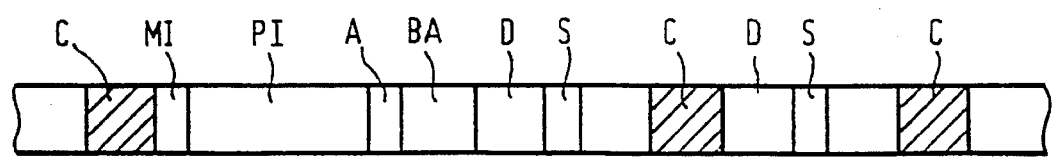

FIG. 5 shows the information sequence during the writing of information in the data carrier. Line a) shows the information sequence when writing is to take place in individual memory locations of given blocks, and line b) shows the information sequence for the writing of a complete block.

For line a) it is assumed that, subsequent to a transmission operation, during the subsequent first period C the pulses have been transmitted for setting the data carrier to the write state. Subsequently, the terminal transmits the mode information MI to the data carrier, which information is in this case assumed to consist of only a single bit. This mode information is compared with tile mode bit MB in the data carrier. When these two values do not correspond, two different conflict situations arise, depending on these two values.

a) When the mode bit MB has the binary value "1", so that the data carrier requires the correct password information for executing the write operation, and the mode information MI has the binary value "0", meaning that no password information is transmitted to the terminal, the data carrier interrupts the write operation immediately and enters the read state, because it can then be directly recognized that no correct write operation can be performed. Unnecessary loss of time is thus avoided.

b) When the mode bit MB has the binary value "0", meaning that writing without password information is possible, and the mode information MI has the binary value "1", meaning that subsequently password information will be transmitted to the data carrier, the data carrier ignores this password information and executes the write operation with the subsequent information as usual. As a result, ignoring the unnecessary transmission of the password information, unnecessary loss of time is again avoided in this conflict situation.

Subsequent to the mode information MI, if having the binary value "1", the password information PI is transmitted. If the mode bit MB has the binary value "1", the password information is compared with the password PW in the data carrier, and the further write operation is enabled in the case of correspondence.

Subsequently, there is transmitted an indicator bit A which indicates whether writing is to take place in a single memory location or in all memory locations of a block. Because it is assumed for the line a) that individual memory locations are to be written, subsequently the block address BA is transmitted and then the memory location address SA, after which the data word D to be written is bit-wise transmitted. This is followed by a protection bit S, for example a parity bit so as to enable the data carrier to check whether the addresses and the data word have been correctly received. Subsequently, there is a time interval without transmission, during which the transmitted data word is written in the memory of the data carrier.

This interval is followed by a test interval C during which the terminal can determine, by transmission of appropriate pulses, whether the data carrier is to remain in the write state or should enter the read state. If no pulses are transmitted, the data carrier enters the read state in which first the last data block programmed is read, followed by reading in conformity with the diagram shown in FIG. 4. However, the data carrier can then also be switched to the write state again, immediately after the reading of the last block programmed, so that writing and directly subsequent testing of the data written is possible a number of times in succession.

For line b) it is assumed that the memory locations of an entire block are to be successively written in. Subsequent to the testing of the mode information MI, and possibly the password information PI, the indicator bit A is transmitted with a different value, followed by a block address BA for indicating the block whose memory locations are to be successively written in, followed by the data word D for the first memory location, followed by the protection information S. The time interval for writing this data word into the memory of the data carrier is followed by a test interval C during which the data carrier can again be switched to the read state. In order to continue the write operation in the normal case, the pulses for setting the data carrier to the write state are again transmitted during this interval, directly succeeded by the data word D for the second memory location of the initially addressed block whose addresses need not be transmitted again in that case. This is followed by the protection information S and the time interval for writing the data word, and so on until all data words of this block have been transmitted and written.

When the block address BA addresses a block which is inhibited from overwriting during the write operation, that is to say during the writing of individual memory words in conformity with the line a) as well as during the writing of an entire block in conformity with the line b), the data carrier immediately interrupts the write operation and enters the read state in which blocks not inhibited from reading are successively transmitted, each time with an intermediate test interval C. Similarly, the data carrier directly enters the read state when it is determined, on the basis of the protection information, that an address or a data word has been incorrectly received. Thus, in response to all information unambiguous actions take place in all states, notably enabling the terminal to react appropriately immediately. The terminal can notably monitor the time interval during which the data carrier, in the case of correct operation, writes a data word into a memory location so as to determine whether the data carrier itself transmits data. When this is the case, the terminal is thus informed that a write operation has been interrupted and a transmitted data word has not been written. Via appropriate pulses during the subsequent test interval C, the terminal can then each time determine whether the transmission is to be continued, for example whether the transmission of a data word for writing is to be repeated, or whether complete reading of all blocks from the data carrier is to be awaited, first.

What is claimed is:

1. A datacarrier for detachable coupling to a terminal for data exchange between the terminal and the datacarrier, comprising:

(a) a read/write memory organized in a plurality of memory blocks, each memory block comprising a plurality of memory locations, (b) inhibiting means for inhibiting or enabling reading and/or writing by the terminal in the read/write memory, (c) first memory locations in one of the memory blocks for storing first information for identifying the memory locations of any of the memory blocks that are to be write-inhibited, (d) second memory locations in one of the memory blocks for storing second information for identifying the memory locations of any of the memory blocks that are to be read-inhibited, (e) third memory locations in one of the memory blocks for storing a password, (f) a fourth memory location in one of the memory blocks for storing a mode bit for controlling an operating mode of the datacarrier, (g) said inhibiting means comprising:
    (i) first means for inhibiting writing in any memory locations of the write-inhibited blocks' memory locations identified by the first information stored in the first memory locations,
    (ii) second means for inhibiting reading in any memory locations of the read-inhibited blocks' memory locations identified by the second information stored in the second memory locations, (iii) third means for comparing a password transmitted from the terminal with the password stored in the third memory locations and outputting a signal indicating the result of such a comparison, (iv) fourth means under the combined control of the comparison result of the third means and the mode bit stored in the fourth memory location for enabling or disabling writing in those blocks which are not write-inhibited by having first information identifying their memory locations stored in the first memory locations.

2. A datacarrier according to claim 1, wherein the inhibiting means are connected for:

(a) enabling writing conditionally upon whether the transmitted password matches the stored password when the mode bit has a first value, (b) enabling writing unconditionally when the mode bit has a second value.

3. A datacarrier according to claim 2, characterized in that the first and second memory locations are in mutually distinct memory blocks.

4. A datacarrier according to claim 2, characterized in that the first, third and fourth memory locations are in the same memory block.

5. A datacarrier according to claim 3, characterized in that the first, third and fourth memory locations are in the same memory block.

6. A datacarrier according to claim 2, characterized in that the datacarrier comprises addressing means for supplying a block address and an intrablock address to the read/write memory, and in that the inhibiting means further comprises:

(a) a first register for loading the memory locations identified by the first information of the write-inhibited blocks from the memory, (b) a first comparator, having inputs coupled to the addressing means and the first register, for receiving the block address and contents of the first register and comparing the contents with the block address, and in response forming a first output signal for inhibiting or enabling writing, (c) a second comparator for comparing the transmitted password with the stored password, and in response forming a second output signal, (d) a second register for loading the mode bit from the memory, and for forming a third output signal therefrom, (e) control means connected for receiving the first, second and third output signals and for inhibiting and enabling writing in the memory in response thereto.

7. A datacarrier according to claim 3, characterized in that the datacarrier comprises addressing means for supplying a block address and an intrablock address to the read/write memory, and in that the inhibiting means further comprises:

(a) a first register for loading the memory locations identified by the first information of the write-inhibited blocks from the memory, (b) a first comparator, having inputs coupled to the addressing means and the first register, for receiving the block address and contents of the first register and comparing the contents with the block address, and in response forming a first output signal for inhibiting or enabling writing, (c) a second comparator for comparing the transmitted password with the stored password, and in response forming a second output signal, (d) a second register for loading the mode bit from the memory, and for forming a third output signal therefrom, (e) control means connected for receiving the first, second and third output signals and for inhibiting and enabling writing in the memory in response thereto.

8. A datacarrier according to claim 4, characterized in that the datacarrier comprises addressing means for supplying a block address and an intrablock address to the read/write memory, and in that the inhibiting means further comprises:

(a) a first register for loading the memory locations identified by the first information of the write-inhibited blocks from the memory, (b) a first comparator, having inputs coupled to the addressing means and the first register, for receiving the block address and contents of the first register and comparing the contents with the block address, and in response forming a first output signal for inhibiting or enabling writing, (c) a second comparator for comparing the transmitted password with the stored password, and in response forming a second output signal, (d) a second register for loading the mode bit from the memory, and for forming a third output signal therefrom, (e) control means connected for receiving the first, second and third output signals and for inhibiting and enabling writing in the memory in response thereto.

9. A data carrier according to claim 2, characterized, in that it comprises control means for receiving mode information from the terminal, comparing said mode information with the mode bit, and in case of mismatch, when the mode bit has the first value, and the mode information has the second value, immediately terminating any write operation, when the mode bit has the second value and the mode information has another value, ignoring the password information.

10. Integrated circuit suitable for use in a datacarrier according to claim 1, and comprising the memory and the inhibiting means.

11. Method for writing data into a datacarrier according to claim 1 wherein a write operation comprising the following steps:

establishing contact between the terminal and the datacarrier, transmitting mode information from the terminal to the datacarrier, and after that, transmitting the password, wherein in the data carrier said mode information is compared with the mode bit, and in case of mismatch, when the mode bit has the first value, and the mode information has the second value, the write operation is immediately terminated, when the mode bit has the second value and the mode information has another value, the comparison between the transmitted password and the stored password is ignored.

12. Method according to claim 11, characterized, in that when the mode bit has the first value and the mode information has the first value, in case of mismatch of the transmitted password and the stored password, the write operation is immediately terminated.

13. Method for writing data into a datacarrier according to claim 1, characterized, in that the method comprises establishing contact between the terminal and the datacarrier, and thereupon letting the datacarrier read contents of blocks for which reading is not inhibited, transmitting these blocks to the terminal in cyclic repetition, and inserting a pause after transmission of each block, the terminal transmitting a write request signal to the datacarrier in the pause when the terminal has write data for writing into the memory, the data carrier terminating transmission of the blocks upon reception of the write request signal.

* * * * *